May 20, 1969  P. BELOKIN, JR  3,444,636
ANIMATED ADVERTISING DEVICE
Filed April 26, 1966

INVENTOR:
Paul Belokin Jr.
By Harbaugh and Thomas
HARBAUGH and THOMAS, Attys.

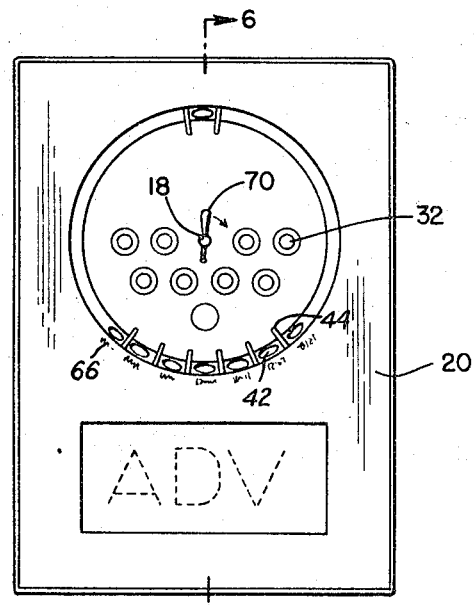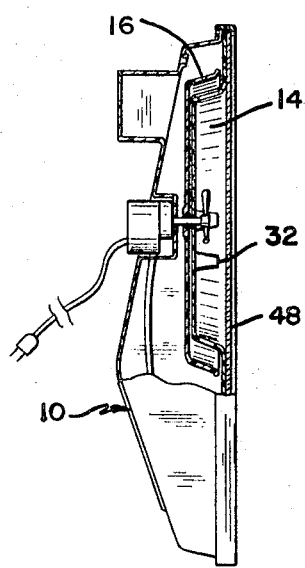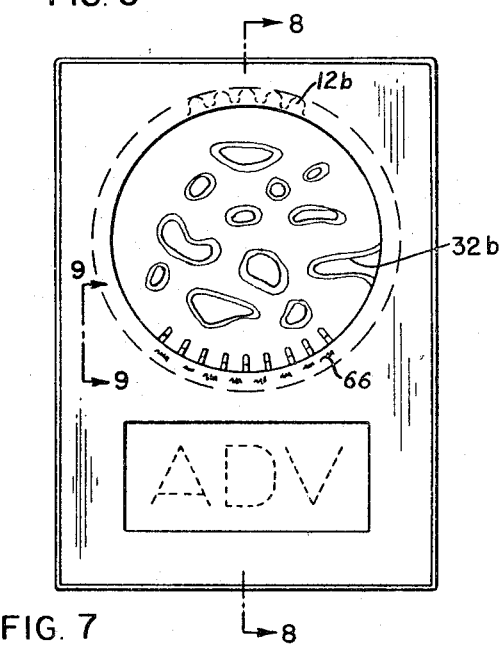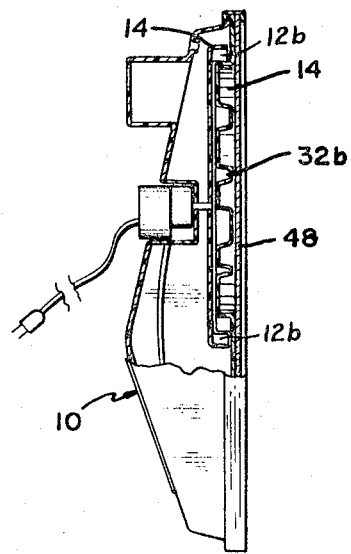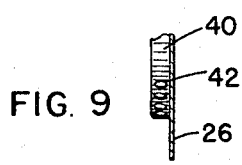

May 20, 1969 P. BELOKIN, JR 3,444,636
ANIMATED ADVERTISING DEVICE
Filed April 26, 1966 Sheet 3 of 3

INVENTOR:
Paul Belokin Jr.
By Harbaugh Thomas
HARBAUGH and THOMAS, Attys.

United States Patent Office 3,444,636
Patented May 20, 1969

3,444,636
ANIMATED ADVERTISING DEVICE
Paul Belokin, Jr., Berwyn, Ill., assignor to Schenley Industries, Incorporated, New York, N.Y., a corporation of Delaware
Filed Apr. 26, 1966, Ser. No. 545,392
Int. Cl. G09f 19/02, 7/00
U.S. Cl. 40—106.25                                                    11 Claims

ABSTRACT OF THE DISCLOSURE

An animated advertising device having two nesting elements, one of which is rotated behind the other by means of a motor supported on a third or backing element. The rotating element is formed with pockets adapted to invisibly carry balls to an elevated position from which they fall, by gravity, through an aperture in the peripheral wall of the stationary front element through a maze of obstacles on the front of said element. The balls collect at the bottom of said stationary element, falling through an aperture in the peripheral wall thereof when one of said pockets is positioned to receive a ball.

---

The present invention relates to animated advertising devices in which the attention of a customer is gained by intermittent sound and movement at approximately eye level, and the observed movements carries the eyes of a viewer unobtrusively to interesting and informative material.

It is found that oft repeated random motion of an illuminated object moving among obstacles with resulting sound effects is a never ending source of attention, interest and entertainment, and that the use of same with name brand or trademark advertising along with an environmental suggestiveness of well known sports or games with which viewers are familiar, provide a dominating recollection or recall pattern for the particular product advertised whenever such products thereafter are generically thought of or mentioned.

This form of advertising is particularly significant with selection and choice and impulse buying where the product advertised is right at hand and is immediately available in competition with other like products as the animation is being viewed. Furthermore, an animated device which invites active participation competitively with other viewers similarly situated stimulates sensory-motor responses psychologically which assist or augment a desirable response-action favorable to the specific product advertised both in immediate response and in associations and recollections which persist for a long period of time.

One of the objects of the invention is to provide an inexpensive animated device which satisfies the above advertising objectives and which in use can be accidentally dropped without breakage, mishandled without damage, and when erected to its upright working position is ready to run when turned on.

A further object is to provide an animated advertising device which when tampered with by unauthorized personnel to usurp the advertising space, provides difficulty in opening and also in reassembling the parts in their operative condition, yet with authorized servicing the advertising can properly be changed with little trouble when desired.

In accomplishing the advertising and tamperproof objectives of the invention the embodiments employ thermoplastic sheet elements of high impact polystyrene which are vacuum drawn to be oriented both monaxially and biaxially so that they have an elastic memory when formed and assembled that will deform their shape against reassembly if heat is used to dismantle them. Three of the integrally formed parts make up the housing. Two of these are closely cooperating elements, one of which is carried rotated by an inexpensive motor. Two other parts are transparent elements, one carrying the advertising and the other comprising a front closure for viewing.

Briefly, the device contemplates essentially two nesting cooperating vacuum drawn plastic elements. The one rotated by a motor is behind the other and is supported by the motor on the third or backing element. One or more elements such as varigated balls are invisibly lifted by the rotating element to an elevated position from which they fall by gravity with random movements through an interesting maze of obstacles on the front of said other element. Thus, they make both an audible impact or clicking sound amplified by the elements and also make visible non-repetitive gyrations ending in a miscellany of terminal stations interestingly and variously identified.

One of the objects of the invention is to provide an inexpensive, rugged animated device of a minimum number of parts of simple form which incorporates the most important psychology factors considered to be of value in attention getting advertising, namely: bright illumination, form and figure contrast, relative motion of objects, three dimensional perception, normally environmentally quiet operation interruped by distinctive sounds of differing successive patterns of short duration, quickly comprehensible subject matter in novel representation and environment, perceivably a non-repetitive pattern of movement, obviously ever changing sensory patterns, awareness and recognition of things observed, a reasonably small viewing area which is one generally related to a foveal image area at a viewing distance comfortable for watching, mimetic induced motory responses, and an overall performance pattern which conforms to the normal fluctuations of attention and relaxation that are related to momentary repeated stimuli with minimal tiring.

Another object of the invention is to induce involuntary attention followed by a continuing attention associated with advertising without necessarily being a part thereof, thereby subconsciously attaining overall favorable reaction and recall characteristics for the advertising.

A further object resides in animated attention getters depicting different environments that are suggestive of conditions or situations favorable or already associated with the advertised subject matter.

These being among the objects of the invention, other and further objects will appear from the appended claims, the description and the drawings related thereto in which:

In the drawings:

FIGS. 5, 7 and 10 are views similar to FIG. 2 showing further embodiments and modifications of the invention;

Figure 1:
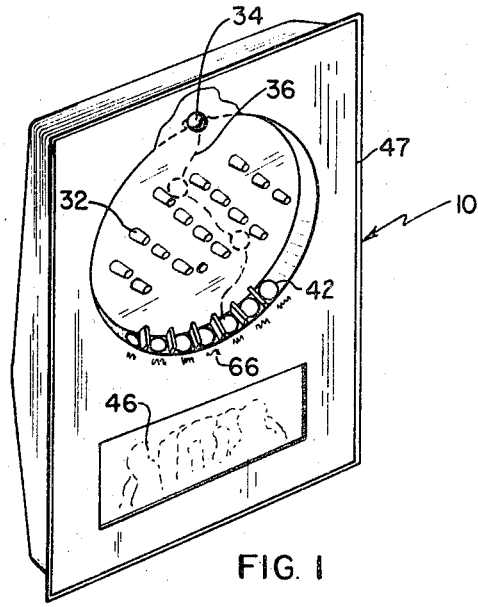
FIG. 1 is a perspective view of a preferred animated advertising embodiment of the invention depicting one animated use thereof.
Figure 3:
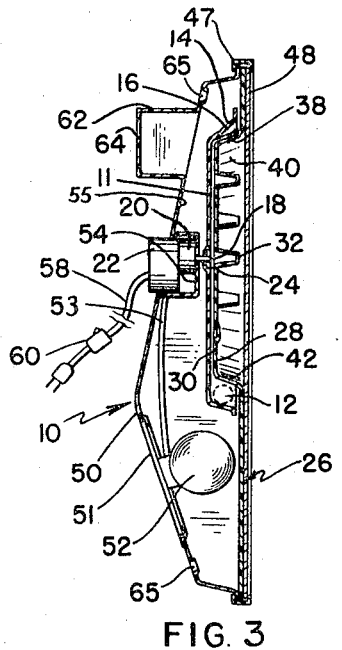
FIG. 3 is a sectional view taken on line 3—3 of FIG. 2.
Figure 2:
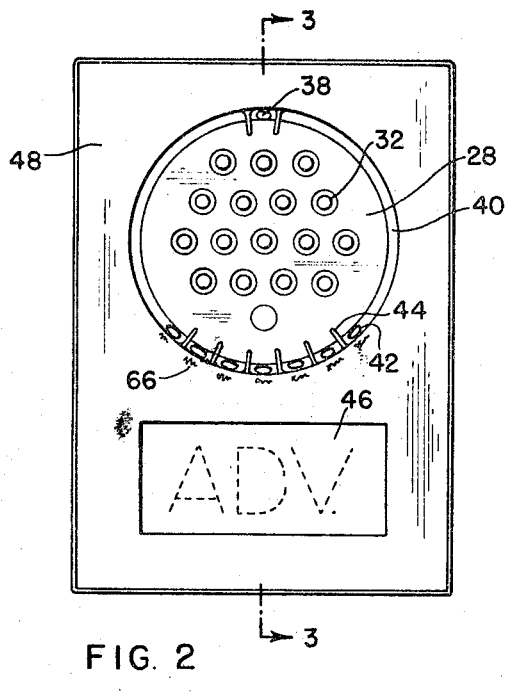
FIG. 2 is a front elevational view thereof.
Figure 4:
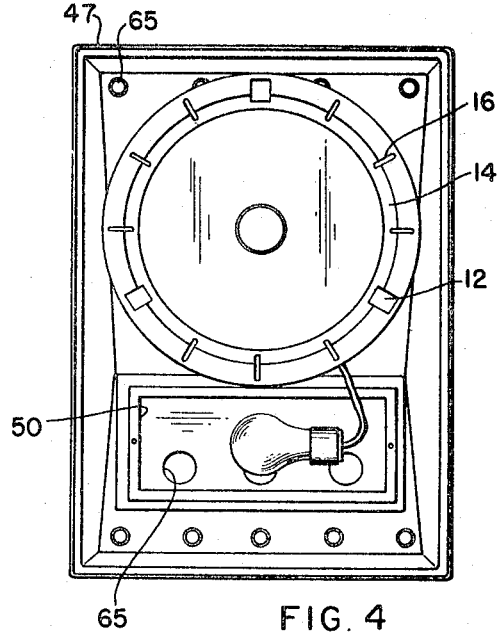
FIG. 4 is a front elevational view of the embodiment shown in FIG. 1 with the front panel removed showing the interior of the embodiment.
Figure 10:
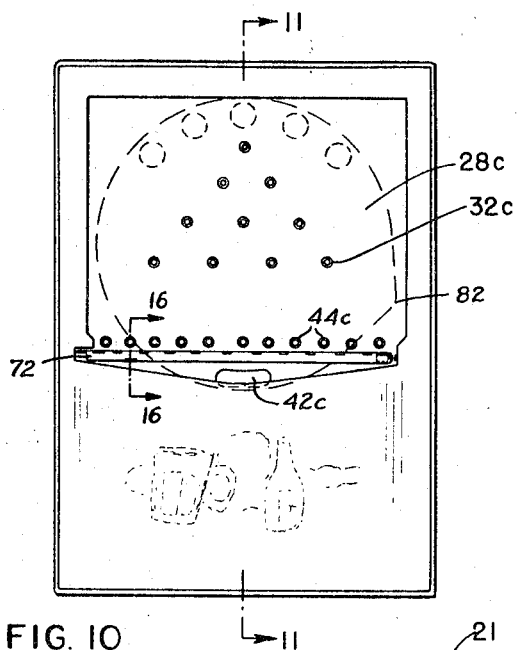
Figure 11:
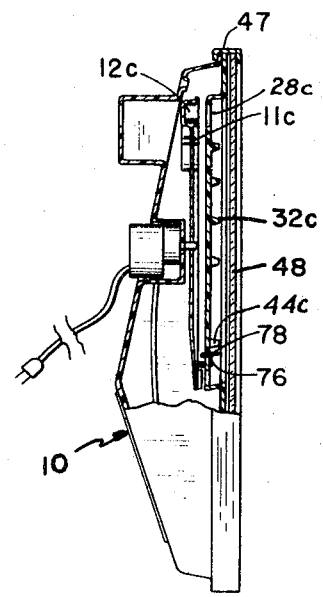
Figure 16:
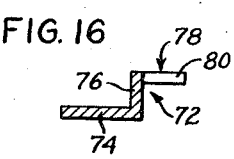
Figure 15:
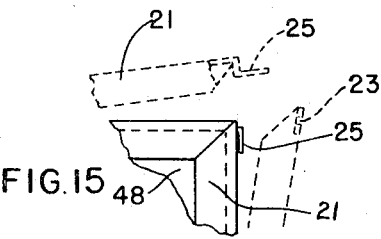
Figure 12:
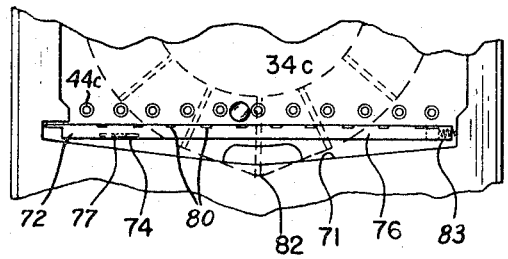
Figure 13:
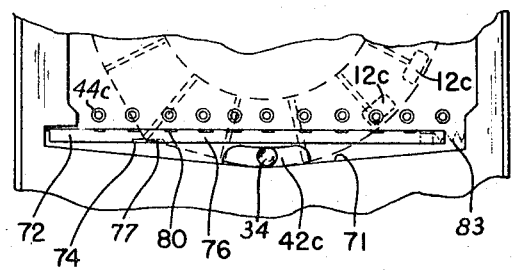
Figure 14:
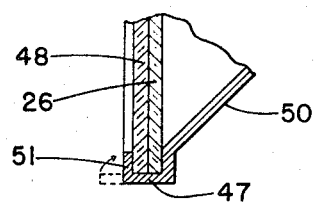

FIGS. 6, 8 and 11 are sectional views taken on lines 6—6, 8—8 and 11—11 of FIGS. 5, 7 and 10, respectively;

FIG. 9 is a sectional view taken on line 9—9 of FIG. 7;

FIGS. 12 and 13 are partial views of a ball dropping mechanism shown in FIGS. 10 and 11 in alternate positions of its operation;

FIG. 14 is a sectional view taken on line 14—14 of FIG. 1 showing one of the arrangements for securing the assembled parts as a unitary assembly;

FIG. 15 is a frontal view at one corner of an embodiment showing another form of securing the parts together either with the embodiment shown in FIG. 14 or by itself alone; and, FIG. 16 is a sectional view taken on line 16—16 of FIG. 10 showing the reciprocated bar according to the invention.

Referring now to the drawings in further detail, FIGS. 1 to 4 show one embodiment 10 of the invention in which a pie pan shaped vacuum drawn rear sheet member 11 has a plurality of circumferentially spaced inwardly opening pockets or recesses 12 in its peripheral wall 14 along with externally disposed reinforcing ribs 16 at spaced points therearound. Preferably, the pan shaped member is made of transparent material to permit full passage of light therethrough.

A low speed output shaft 18 of a gear train 20 which is driven by an electric motor 22 supports and rotates the pan-like member 11 by a drive engagement therewith at its center involving a flanged coupling 24.

A stationary front sheet member 26 has a vacuum formed recess 28 in its upper portion whose rear convexity closely nests in the concavity of the pan member 11 to permit rotation of the pan member without touching it. Projecting from the bottom 30 of the recess 28 on its concave side are integral hollow pegs 32 which serve as obstacles to the free falling of a playpiece such as a ball 34. The pegs are arranged in any pattern which provides a random path of movement for the ball, one of such being represented by broken line 36 in FIG. 1. An entrance opening 38, sometimes referred to as a drop opening, is provided through the top of the peripheral wall 40 of the stationary recess 28 to admit and place in operation the ball in full view in the recess. At the bottom of the recess 28 the wall 40 has a series of dropout openings 42 with partitions 44 between them.

The peripheral wall 14 of the rotating element serves as a temporary bottom for the drop-out openings until the pocket 12 passes below them at which time the ball drops out of sight into the pocket and is carried invisibly back to the top opening 38 as held in the pocket by the wall 40 until it is free to fall again through the entrance opening 38 for another cycle. In this connection it should be noted that as the hollow reinforcement ribs 16 pass below the drop-out openings, the ball is jostled vertically for continuing animation thereof with some suspense as to when it will drop out of sight to start another cycle.

At one side of the recess 28 a panel 46 is provided upon which advertising material is mounted either as a decal or as an independent direct element. Preferably a color transparency film is used as supported by corner applications of pressure cement. The transparent plastic front member or window 48 is otherwise relied upon to hold the transparency in place and also to retain the falling ball in the plane of the pegs while it is active in the recess 28.

A vacuum drawn sheet metal back 50 encloses the rear of members 11 and 26 and supports them along with the transparent front member 48 within a marginal flange 47 which when the device is first assembled has an outer portion 51 which extends beyond the front face of the front member 48. When the assembly is finalized, this extending portion is molded by a heated iron inwardly and around the edge and against the front marginal face of the transparent front member 48 as shown in FIG. 14. This securement prevents tampering and may be left as it is to frame the article or as shown in FIG. 15 channel strips 21 may be added about the edges of metal back 50, front sheet member 26 and window 48. In the latter construction, channel strips 21 are secured together by means of fingers 25 extending from one of said channel strips into aperture 23 formed in the adjacent channel strip, said finger being bent to extend parallel to said adjacent channel strip. Preferably heavy strips of decorative pressure sensitive tape can be added to finish the edge with a finished frame appearance.

Behind the advertising panel 46 an access opening is provided in the metal back 50 which carries a removable panel 51 carrying a light bulb or fluorescent tube 52 which is replaceable when the panel 51 is removed. The motor 22 is located and supported in a rearwardly facing recess 54, with suitable apertures being provided in the wall thereof to accommodate the shaft 18 and the power cord 53 leading to the bulb 52. The bulb and motor are powered through an extension cord 58 having an ON and OFF switch 60 therein.

In the forming of the back cover a rearwardly extending hollow boss 62 is provided having a hole 64 by which the device can be hung on a room wall (not shown). Between the top and bottom of the back cover 50 the rear wall thereof is arched rearwardly to provide an inclined reflecting surface 55 which reflects light rays from the bulb through the transparent back of the member 11 and against the back of the front member 26. The mounting plate 51 reflects light rays against the back of the advertising.

Air circulating openings 65 at the top and bottom permit the passage of air to reduce the heating effect of the light bulb 52.

Indicia 66 is placed on the front member 26 in embodiments of FIGS. 1, 5 and 7 below the holes 42 between the wall 40 and the advertising panel 46 so that the eyes of viewers following the flight of the ball will move in a direction towards the advertising panel with an end result that if it is not the first thing noted, viewers' eyes will be started in that direction towards the advertising. Repeated viewings will follow. What is viewed in the advertising panel is, of course, the advertiser's responsibility.

In operation when the switch 60 is turned ON, the light 52 will be effective over the entire front panel through a single thickness of translucent plastic and particularly at the panel 26 so that a color transparency thereon is brightly lighted with direct light. Preferably the rotating pan element 11, as already mentioned, is made of transparent plastic which transmits full illumination to the animation area.

The speed of the pan member 11 is slow, preferably around one or two revolutions per minute with the ball traveling two-thirds of the distance of each revolution whereby attention can be relaxed between the dropping of the ball to avoid attention fatigue so that fresh attention is attained for successive viewings as frequently as possible without undue fatigue. More balls can be added if rapidity is a play factor.

The sound of the ball striking the pegs is resonated through the integrated structure of the front member 26. It constitutes the attention and direction factor, whereupon the repeated sounds become secondary when the device is being viewed.

A sport such as hockey, soccer, football or baseball can be depicted upon the bottom 30 of recess 28, and if played, can be scored in accordance with the indicia 66.

Referring now to further embodiments of the invention, FIGS. 5 and 6 show a rotating bat 70 that is supported on the drive shaft 18. It will be noted that bat 70 and rotating sheet member 11 are maintained in the same relative position since both are rotated on shaft 18. As noted in FIG. 4, rotating sheet member 11 is provided with three pockets equally spaced along its periphery. Accordingly, the orientation of bat 70 to the ball dropping from one of said pockets 12 depends on the pocket from which the ball is dropped. This arrangement adds to the unpredictability of the course of the ball, and therefore to the interest attracting ability of the device.

In FIGS. 7 and 8, the pattern of the pegs is modified to depict golf course hazards 32b and any number of balls can be used, preferably up to five, which depict the strokes that can be scored by one player on one hole with respect to hazards for pars and bogeys on one hole, or four different colored balls can be provided, as for a foursome with which the scoring of successive slots can proceed with repeated cycles until one or all players are holed out for each hole. Sheet member 11 is formed with a plurality of adjacent circumferentially spaced inwardly opening pockets or recesses 12b in its peripheral wall 14. As shown in FIG. 9, the bottom of peripheral wall 40 of front sheet member 26 is formed with a group of spaced apertures 42 extending therethrough and separated by partitions 44.

A further embodiment is shown in FIGS. 10 to 13 which depict a bowling game with the pegs 32c formed and colored as bowling pins and with at least two balls dropping through the pegs to come to rest in various pockets disposed in a straight line like a bowling score sheet for scoring ten frames. In this embodiment, the recess 28c is substantially rectangular and the rotating member 11c has axial pockets 12c at its periphery.

The lower 71 of the recess 28c is trough-shaped as seen in FIGS. 10, 11 and 13 and is provided with a horizontal elongated lateral drop out opening 42c along the bottom thereof. A series of partitions 44c spaced above the trough define ten frames. A horizontally reciprocated bar of L-shaped cross-section 72 is supported below the partitions by two rearwardly extending ears 74 formed in its upright flange portions 76 and slidably supported in elongated slots 77 that are located near the bottom of recess 28c. Trap doors are simulated in horizontal flange portion 78 of bar 72 by cutting away portions of said horizontal flange, leaving sections 80 thereof. These sections are normally maintained below the level of the space defined between the partitions by a light tension spring 83 connected thereto at one end (FIG. 12). As the balls 34c drop between the partitions they come to rest on the sections 80. FIG. 16 shows a cross-section of bar 72 taken across one of ears 74 and a cut away portion of horizontal flange 78.

It will be observed that the rotating member 11c has a protrusion 82 thereon well ahead of the pickup pockets 12c and also that the left most of ears 74 lies in the path of protrusion 82 whereby, as the protrusion engages and displaces the left most ear 74 and therefore bar 72 to the left, the sections 80 are moved from under the balls to permit them to drop through into the trough 71 from whence they pass through the opening 42c into the pockets 12c when they coincide therewith in their movement. When protrusion 82 passes out of contact with ear 74, the spring 83 returns the bar 72 and therefore sections 80 to their normal position for the next cycle. This enables a number of balls to be dropped as a group, held as a group for scoring and then recycled as a group.

The vacuum drawn elements are preferably of high impact polystyrene, and the transparent front panel is preferably of a heat resistive material such as polymonochlorotrifluoroethylene or plain glass.

Having thus described the invention and several embodiments thereof, it will be appreciated how the various objects and advantages as an attention getting and holding animated advertising device are attained, including periodic changing of the advertising and type of game merely by the exchange of front panels or parts thereof, and how various and other games can be depicted without departing from the spirit of the invention, the scope of which is commensurate with the appended claims.

What is claimed is:

1. An animated advertising device comprising adjacent upright front and rear members, said front member having a rearwardly extending recessed portion, said recessed portion being formed with at least one aperture at the top periphery thereof and at least one aperture at the bottom periphery thereof, said rear member being rotatable with respect to said front member about a horizontal axis extending substantially normal to said front member recessed portion, said front member having at least one pocket disposed so that its opening is in facing communicating relation to said apertures when said pocket is carried past said apertures during the rotation of said rear member; a substantially transparent panel spaced from and at least covering the front face of said front member recessed portion; a group of spaced obstacles extending substantially between said front member recessed portion front face and said transparent panel; and at least one movable playpiece adapted and sized to be carried by said pocket to said top aperture, to be dropped through said top aperture past said obstacles, contacting said obstacles for random movement therethrough to said bottom aperture, said playpiece passing into said pocket for recycling when said pocket is in facing relation with said bottom aperture.

2. An animated advertising device as recited in claim 1, including an advertising panel on one of said members in close proximity to said front member recessed portion.

3. An anmated advertising device as recited in claim 2 including a back cover supporting a motor for supporting and propelling said rotatable rear member and having an inclined wall behind said rear member, and
   illumination means behind said advertising panel open to said inclined wall for reflection of light from said illuminating means onto the back of said rear member.

4. An animated advertising device as recited in claim 3, including a variantly translucent member having advertising indicia thereon mounted on said advertising panel.

5. An animated advertising device as recited in claim 2, wherein said front member is adapted to close said pocket opening when said opening is disposed other than facing an aperture to retain said playpiece therein.

6. An animated advertising device as recited in claim 2, wherein said rotatable rear member includes a substantially pie pan shaped portion defined by a peripheral wall, said front member recessed portion nesting within said rear member pie pan shaped portion and being defined by a peripheral wall facing said pie pan shaped portion peripheral wall, said pocket and apertures being formed in said respective peripheral walls.

7. An animated advertising device as recited in claim 6, wherein said front member recessed portion peripheral wall is formed with a plurality of spaced apertures at the bottom thereof, and a plurality of partitions fixed to said peripheral wall, at least one of said partitions being disposed in the space between adjacent bottom apertures, whereby said playpiece will be maintained adjacent one or another of said bottom apertures until said pocket is in facing relation therewith.

8. An animated advertising device as recited in claim 6, including a plurality of spaced ribs disposed on said pie pan shaped portion peripheral wall facing said recessed portion peripheral wall whereby said pie pan shaped peripheral wall is reinforced and a playpiece resting in said bottom aperture is jostled by said ribs for continuing animation thereof.

9. An animated advertising device as recited in claim 2, wherein said front member recessed portion is formed with a trough-like bottom peripheral wall, said bottom aperture being disposed at the apex of said trough-like peripheral wall, and including a plurality of horizontally spaced partitions above said wall, trap door means between said partitions and said trough-like wall, said trap door means being horizontally displaceable between first and second positions, said trap door means including a plurality of horizontally spaced elements adapted to retain said playpiece between said partitions in said first position and to permit said playpiece to fall between said partitions and elements to said trough-like peripheral wall in said second position, means on said rotating rear member momentarily engaging said trap door means for displacing said trap door means and the elements thereof as a unit from said first to said second position, and means for automatically returning said trap door means to said first position.

10. An animated advertising device as recited in claim 1 including a back cover of vacuum drawn thermoplastic supporting a motor propelling said rotatable front member, and terminating in a marginal flange extending around and over the edges of said transparent panel and said front member to hold them in unitary assembled relationship.

11. An animated advertising device as recited in claim 1 including a motor and speed reduction unit disposed exteriorly of the other of said members having a drive shaft extending therethrough, and
   means upon the drive shaft supporting and rotating said rotatable rear member.

References Cited

UNITED STATES PATENTS

| | | | |
|---|---|---|---|
| 592,004 | 10/1897 | Ebersole | 273—138 |
| 1,487,816 | 3/1924 | Sintzel | 40—106.25 X |
| 1,504,883 | 8/1924 | Fazio | 40—106.25 X |
| 1,879,511 | 9/1932 | Rodgers | 273—138 |

FOREIGN PATENTS 571,267  12/1957  Italy.

EUGENE R. CAPOZIO, *Primary Examiner.*
RICHARD CARTER, *Assistant Examiner.*

U.S. Cl. X.R.

273—138; 40—125